US006911918B2

(12) United States Patent
Chen

(10) Patent No.: US 6,911,918 B2
(45) Date of Patent: Jun. 28, 2005

(54) TRAFFIC FLOW AND ROUTE SELECTION DISPLAY SYSTEM FOR ROUTING VEHICLES

(76) Inventor: Shawfu Chen, 8 Maplewood Dr., New Milford, CT (US) 06776

( * ) Notice: Subject to any disclaimer, the term of this patent is extended or adjusted under 35 U.S.C. 154(b) by 33 days.

(21) Appl. No.: 10/324,463

(22) Filed: Dec. 19, 2002

(65) Prior Publication Data

US 2004/0119612 A1 Jun. 24, 2004

(51) Int. Cl.[7] ......................... G08G 1/123; G01C 21/30
(52) U.S. Cl. ........................... 340/995.13; 340/995.12; 340/995.19; 340/905; 701/208; 701/209; 701/211; 701/119
(58) Field of Search ............................ 340/905, 995.12, 340/995.13, 995.19; 701/208, 209, 210, 211, 212, 213, 119, 117, 118

(56) References Cited

U.S. PATENT DOCUMENTS 5,257,023 A * 10/1993 Furuya .................. 340/995.13
6,466,862 B1 * 10/2002 DeKock et al. ............. 701/117
6,662,105 B1 * 12/2003 Tada et al. .................. 701/209
2002/0120389 A1 * 8/2002 Fushiki et al. .............. 701/117

* cited by examiner

*Primary Examiner*—Donnie L. Crosland
(74) *Attorney, Agent, or Firm*—Hosmer & Reiter; Howard S. Reiter, Esq.

(57) ABSTRACT

A real-time vehicular traffic flow display system employs groups of monitor stations positioned at spaced-apart locations along vehicular roadways, to sense the speed of traffic flow on a given portion of a route. Individual section stations each serve a sequential group of different monitor stations. Each monitor station senses the speed of vehicular traffic a given road portion and transmits corresponding information to an associated section station; each section station processes the received signals, and transmits them to display stations on board vehicles in addition to sending the signals to an optional geographic area central station. The signals transmitted to vehicles present information concerning traffic speed for each monitored portion of a road in addition to identifying the road portion; traffic speed information is processed to identify predetermined ranges of average speed in selected colors. Each vehicle station includes a Global Positioning System (GPS) receiver and visual display device with access to both the GPS including a database of local area road maps for display. All portions of each monitored route on a displayed map are shown in a color corresponding to the average speed of traffic monitored on the corresponding route portion. The current position of the vehicle station is shown on the map, and a "preferred" route from that location to an optionally selected destination is highlighted; both functions are accomplished in accordance with known GPS technology. An optional geographic area central station stores information not usually available in the on-board vehicle station, such as wide-area maps, and also receives traffic condition signals from various section stations including those beyond the range of the vehicle station. The central station correlates these two sources of information and makes the combined results available for separate access by users of the system.

4 Claims, 16 Drawing Sheets

TRAFFIC FLOW AND ROUTE SELECTION DISPLAY SYSTEM FOR ROUTING VEHICLES

BACKGROUND OF THE INVENTION

This invention relates generally to a traffic information display system that facilitates choosing a route for a vehicle and, more specifically, this invention relates to a system for displaying in color-coded visual format, on board a vehicle, information concerning the rate of flow of traffic on routes surrounding the vehicle. The system of the invention is particularly useful for users directing a land vehicle toward a given destination wherein a variety of routes may be available for such travel, but traffic conditions on one or more alternate routes may be more favorable than on others.

At present, many forms of traffic sensors and display systems are known. In the known systems, sensors are positioned along roads and set up to transmit information signals concerning traffic flow conditions. The transmitted signals are received at various locations where the information they represent is recorded and/or processed for further use. Some of the existing systems for processing or using such vehicular traffic information also make use of signals transmitted by the satellite-based Global Positioning System (G.P.S.). Some known display systems make use of stored signals for displaying road map representations of selected geographic areas.

However, none of the existing road and traffic reporting/display systems are known to provide real-time displays of current traffic conditions along selected and alternative routes in an area surrounding a vehicle. Existing systems are not known to include any provision for visual displays of traffic speed information that is specific to routes between the vehicle location and a destination selected by the user. And further, existing systems are not known to provide in any form, for identifying alternate routes that are preferable based upon comparative traffic speed conditions and/or travel time to a given destination.

SUMMARY OF THE INVENTION

The present invention provides a method and apparatus for allowing an operator to direct a vehicle toward a selected destination, talking into consideration relative traffic conditions on available routes. The invention employs spaced-apart traffic sensor monitors positioned at intervals along established travel routes, the monitors being capable of sensing traffic speed conditions separately for each direction of travel, and transmitting representative signals to another location. Combined or separate sensors may be employed for each travel direction. Groups of monitor sensors within geographic locales, identified as "sections", are associated with section stations.

Each section station embodies a receiver for receiving traffic condition signals in sequence from each monitor sensor station within the associated geographic section, a data processor for processing traffic condition signals reported by the monitors, and a transmitter for transmitting processed traffic information signals to vehicles within the geographic section served by the section station, The processor in a section station may be programmed to recognize the average speed of reported traffic within a section or monitored portions of a section, and to assign a color codes to average speeds within predetermined ranges. Alternatively, color-coding signals for each individual route portion or section may be created and then transmitted from within each monitor station or color coding may be created within each vehicle station. Those skilled in the art will recognize that it will generally be preferable to perform color coding assignment early in the transmission sequence, to reduce the complexity and density of the transmitted information signals.

An optional central processing station also be provided to receive traffic condition information signals from the various section stations. The central processing station stores a database of additional information such as wide area road maps that can be transmitted selectively to one or more vehicles, together with traffic information received from various section stations in other geographic areas within the range of the central station. Transmissions from the central station to a particular vehicle are sent in response to an interrogation signal from a vehicle, so as to provide vehicle operators with optional information not otherwise available from the section stations and the database unit on board a vehicle.

In accordance with the invention, a mobile receiving station in a vehicle receives signals from the section stations and, optionally, from the optional central stations. The vehicle station incorporates a conventional GPS navigational display device which includes a database unit containing map display data for areas surrounding the vehicle receiving station, and a visual display unit capable of displaying selected map with road sections displayed in predetermined colors corresponding to traffic speed conditions reported by the monitors on those routes. In operation, the system of this invention utilizes existing GPS methods and the data signals that are routinely transmitted by the GPS to mark the position of a corresponding vehicle station on the displayed local area road map. This technology is well-known at this time. The system further uses similar information derived from the GPS to highlight a "preferred" route from the vehicle station's location to an identified given destination. The "preferred" route is determined in accordance with known GPS technology based at least in part upon distance and travel time data for given road sections that are available within the GPS system.

In a further embodiment of the invention, a vehicle station may access relevant information downloaded from a remote source such as a portable computer. This permits a user of the invention to display or otherwise utilize information not readily available from GPS data banks or from memory units incorporated into the system of the invention.

Accordingly, it is an object of this invention to provide an on-board traffic reporting and display system for vehicles, that offers to vehicle operators a display of routes surrounding the vehicle where the speed of current travel on each route is identified by visual indica.

Another object of the invention is the provision of a traffic reporting and display system that employs color coding to identify average traffic speed conditions on different available routes between a vehicle and a selected destination.

Still another object of this invention is the provision of a traffic system for vehicles that offers users a choice of alternate routes based upon the rate of traffic flow on each possible route.

Another and further object of the invention is the provision of a color-coded traffic flow reporting and display system that interacts with publicly available global positioning system [GPS] data to mark the location of a vehicle on a displayed road map.

Still another and further object of the invention is the provision of a traffic reporting and display system that employs algorithms for: collecting real-time traffic speed data; selecting map displays in response to signals received into the system; and determining the color-coding that will be applied to sections of displayed routes in accordance with reported traffic information signals for pre-determined portions of those routes; and Yet another and further object of the invention is the provision of a real-time traffic reporting and display system that employs color-coding to identify traffic speed conditions, and permits users to associate frequently used destinations with predetermined selection signal devices such as dedicated push buttons, so as to facilitate the display of appropriate possible routes to those destinations.

These and still other and further objects, features and advantages of this invention will be made apparent to those having skill in this art by the following description considered together with the accompanying drawings, in which:

DETAILED DESCRIPTION OF THE PREFERRED EMBODIMENT

Figure 1:
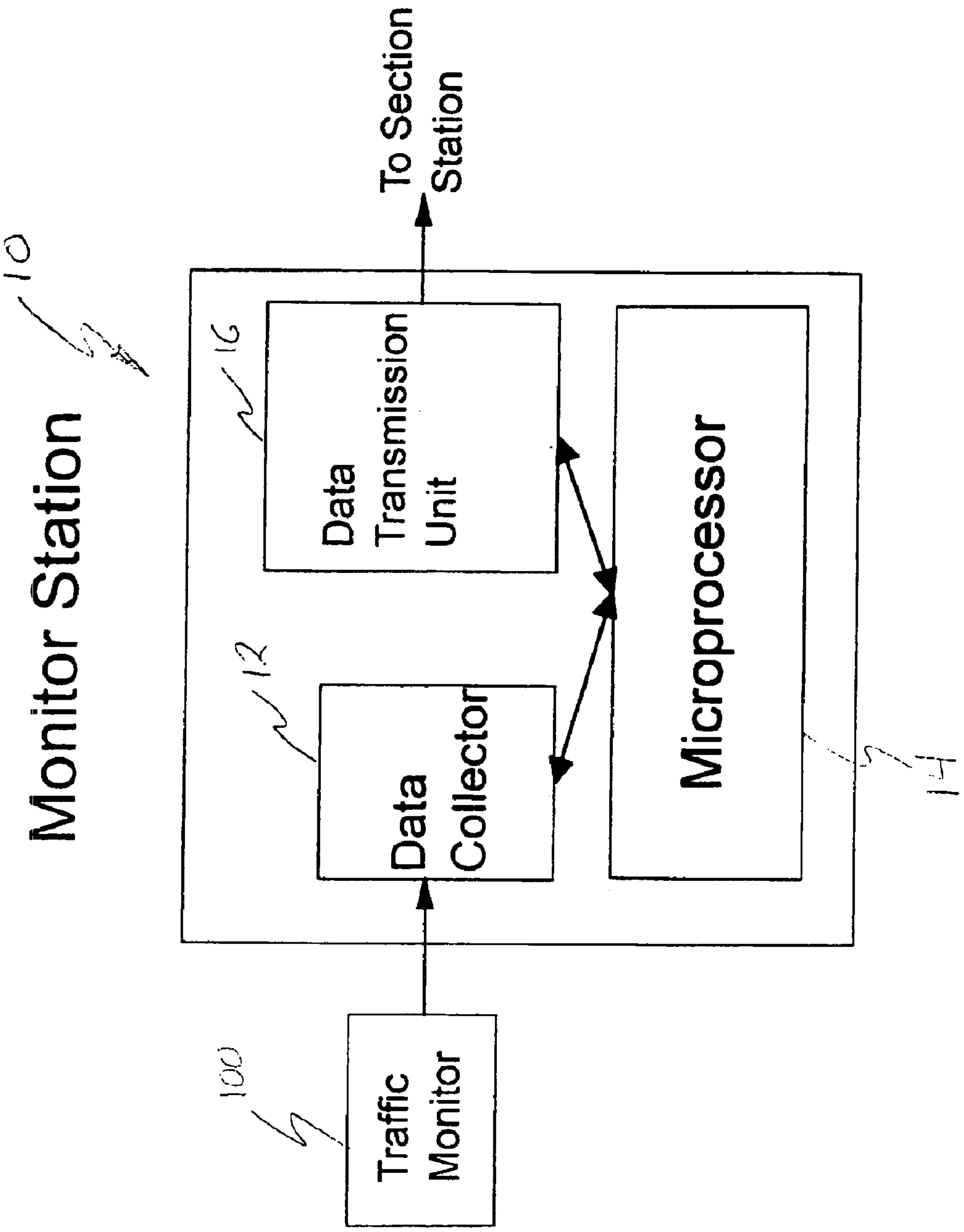
FIG. 1 is a block diagram of a monitor station in accordance with this invention.

Referring now to the drawings, a monitor station 10 in accordance with this invention, as shown in FIG. 1 may be seen to comprise a data collection device 12 of any suitable well-known design for receiving electronic traffic speed signals from a traffic monitoring sensor or transducer 18, which also may be of any suitable type. The collection device 12 is connected to a microprocessor 14 capable of storing signals received by the collection device 12 and processing those signals to create data signals representative of the speed of traffic passing the monitor station 10.

It should be understood readily by those skilled in the related art, that any of the signals referred to herein may be either analog or digital or, if desired, a combination thereof. In the event that a combination of such signals are used, a suitable analog/digital [A/D] converter device of readily available type may be incorporated into the system of this invention at any suitable point, to accommodate any necessary conversion from one type of signal to the other.

Figure 2:
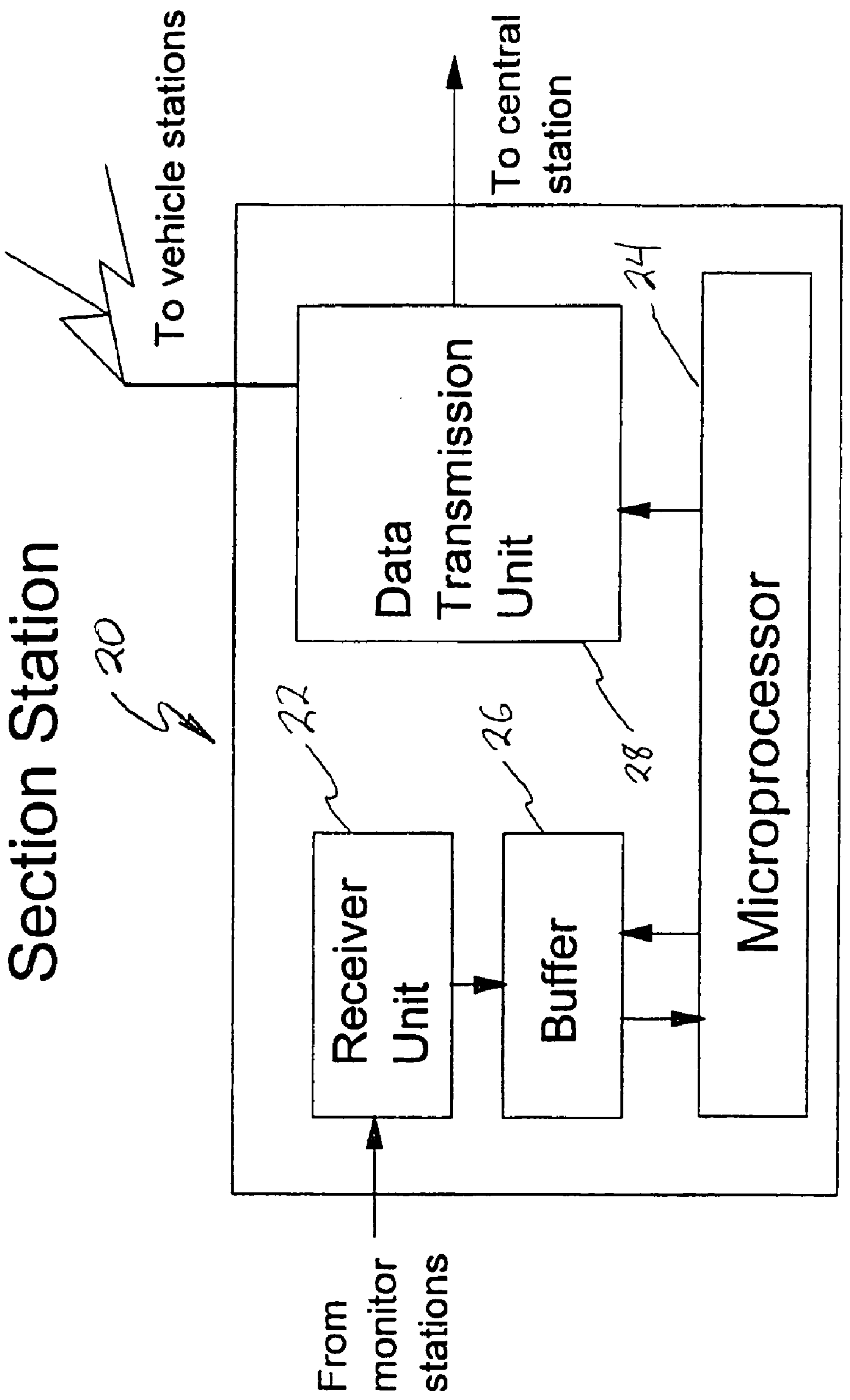
FIG. 2 is a block diagram of a section station in accordance with this invention.

Microprocessor 14 of monitor station 10 is coupled in turn to a data transmission unit 16 which transmits signals from microprocessor 14 to a section station 20 as shown in FIG. 2, via wire or wireless, in any well-known manner. As disclosed herein, each section station 20 receives traffic speed data signals from a plurality of separate, but associated, monitor stations 10. The monitor stations 10 are installed at substantially uniformly spaced-apart locations along existing vehicular routes within a given geographic section. Each section station 20 incorporates a receiver unit 22 (for receiving traffic-speed data signals transmitted from each associated monitor station 10), a microprocessor unit 24 (for processing the signals received by receiver 22), and a buffer unit 26, interposed between receiver 22 and processor 24, for assuring that received signals are maintained independently of each other so that they can be processed and identified independently of each other in processor 24. In accordance with this invention, each section station 20 embodies a data transmission unit 28 for transmitting processed traffic information signals to vehicles within the geographic area served by the section station. Signals generated by transmission unit 28 also may be sent, via wireless or wire, to an optional central data processing station 30, shown in FIG. 10 and further described below. For signal transmission from section stations to a central station, transmission via wire may be preferred when the transmission distances involved.

Figure 3:
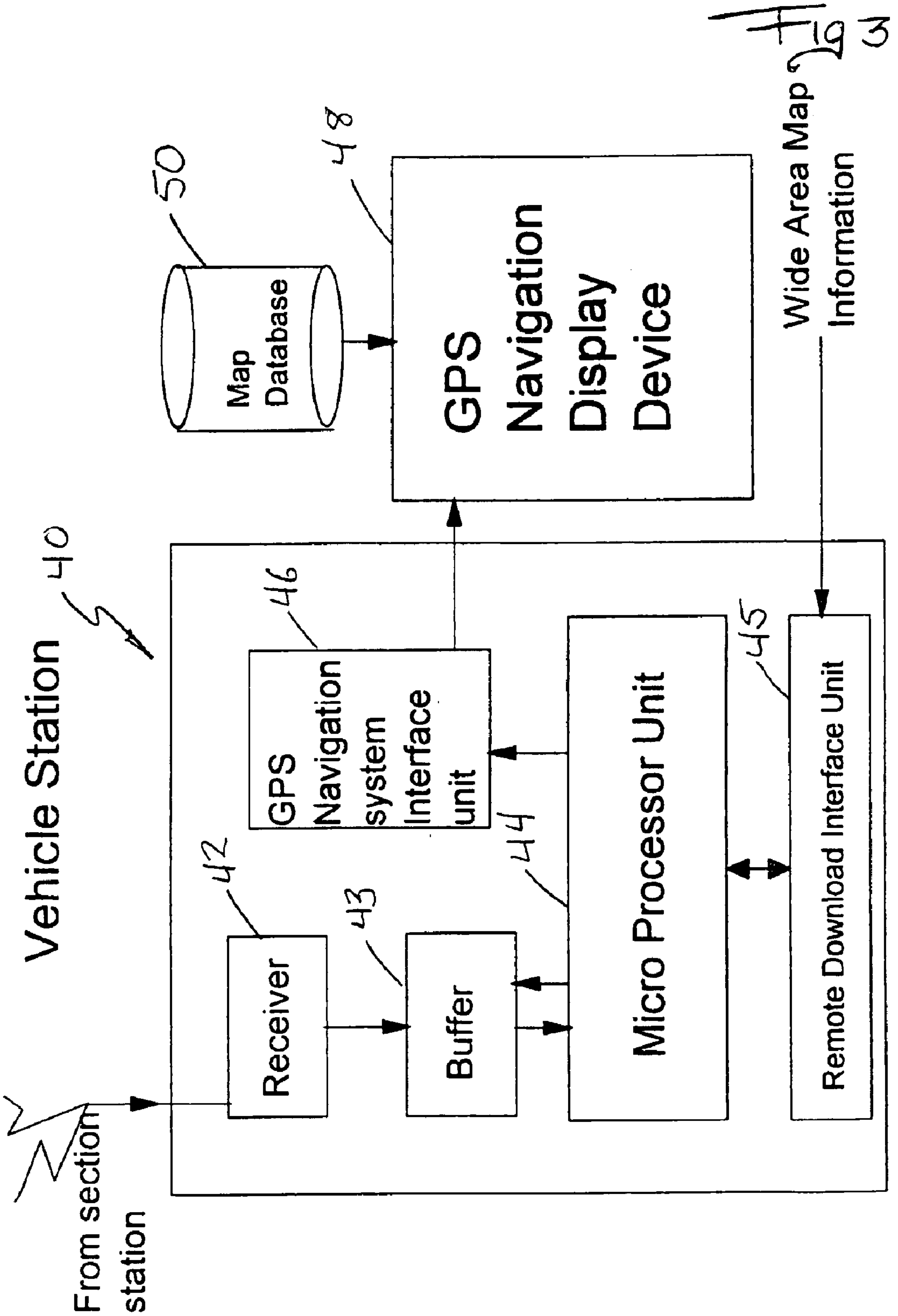
FIG. 3 is a block diagram of a vehicle station in accordance with this invention.

As shown in FIG. 3, vehicle station 40 in accordance with this invention embodies a vehicle receiver unit 42, a vehicle microprocessor 44 coupled to the receiver 42 via a buffer 43, a Global Positioning System (GPS) interface unit 46 coupled to the output of the microprocessor 44, a visual display unit 48 (preferably a GPS display unit of any conventional type) coupled to the output of the interface unit 46, and a map database unit 50 coupled to or incorporated as part of the display unit 48 to provide access to stored data representing road maps of the area served by a plurality of related section stations 20. Interface unit 46, display unit 48 and Further in accordance with this invention, vehicle station 40 incorporates a remote download interface unit 45 coupled to exchange data signals with processor unit 44, and to receive signals from a device such as a portable personal computer [not shown] coupled to a serial port interface device such as remote download interface unit 47, so that processor unit 44 can receive information from external sources concerning matters of importance to an operator of the vehicle. That is, the operator may wish to seek information concerning a route or routes between particular widespread points of departure and destination that are outside the area covered by one or more local section stations Accordingly, before an operator sets out on a vehicular trip, pertinent information may be downloaded into a portable computer and then from the portable into the system of this invention, using a remote download interface unit 47 as indicated in FIG. 3. Those having skill in this art will recognize that each of the electronic data processing, storage and display units referred to herein may be of known design and function, and a variety of such units currently are available to carry out the independent functions or steps disclosed herein.

Figure 10:
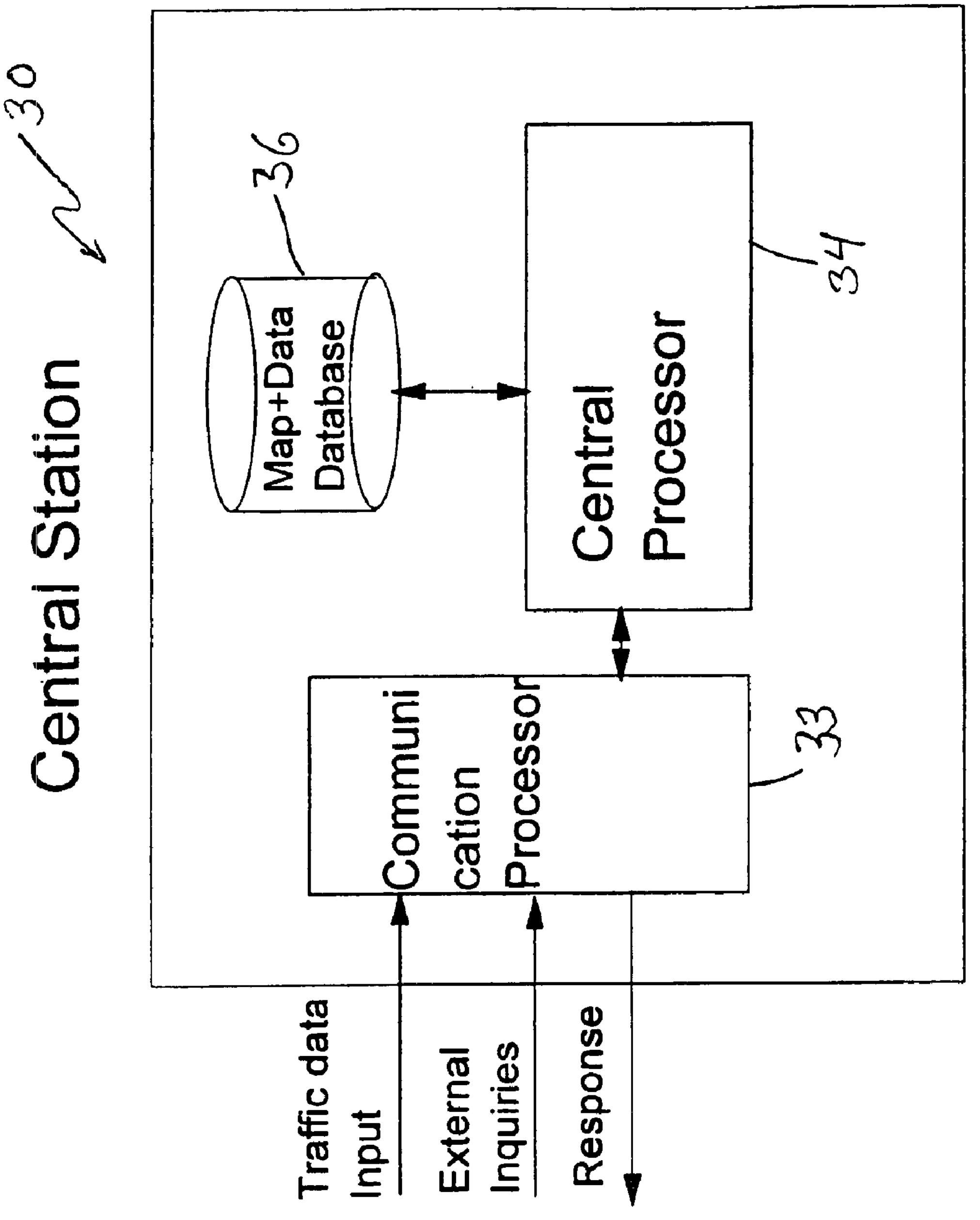
FIG. 10 is a block diagram representation of a central station for use in conjunction with the system of this invention.

Optional central data processing station 30 in accordance with this invention, shown in FIG. 10, embodies a central station communications processor 33 for receiving traffic information signals from section stations 20 and such other external sources as may be desired. Central stations 30 may receive external interrogation signals as well, via access channels such as the internet, or cellular telephones or from a vehicle station 40. Central Stations 30 further embody a central station processor 34 coupled to the communications processor/receiver 33, and one or more central database storage units 36 for storing map and other information signals related to the wider area served by the central station. The central station periodically polls all section stations within the geographic area assigned to the central station to collect and store signals indicative of reported traffic conditions. The signals are stored in a pre-sorted scheme, for example according to road identification symbols, so that data for desired roads can be retrieved easily. In this regard, communications processor 33 is equipped to respond to external interrogation signals with information stored in and available from data storage units 36.

In the operation of the system of this invention, each monitor station 10 transmits to its associated section station 20, data signals representing the speed and direction of vehicular traffic passing that monitor station. The exact identity of the monitor station, corresponding to a particular portion of a particular route is either included in the signals transmitted by the monitor station to the section station, or this information is added automatically by the section receiver 22 or section processor 24 based on preset stored data. Further, the traffic speed information transmitted from each monitor station either represents the calculated average speed of the monitored traffic during a given time period or it represents raw speed data, in which case, average speed is calculated by processor 24 in section station 20.

Figure 4:
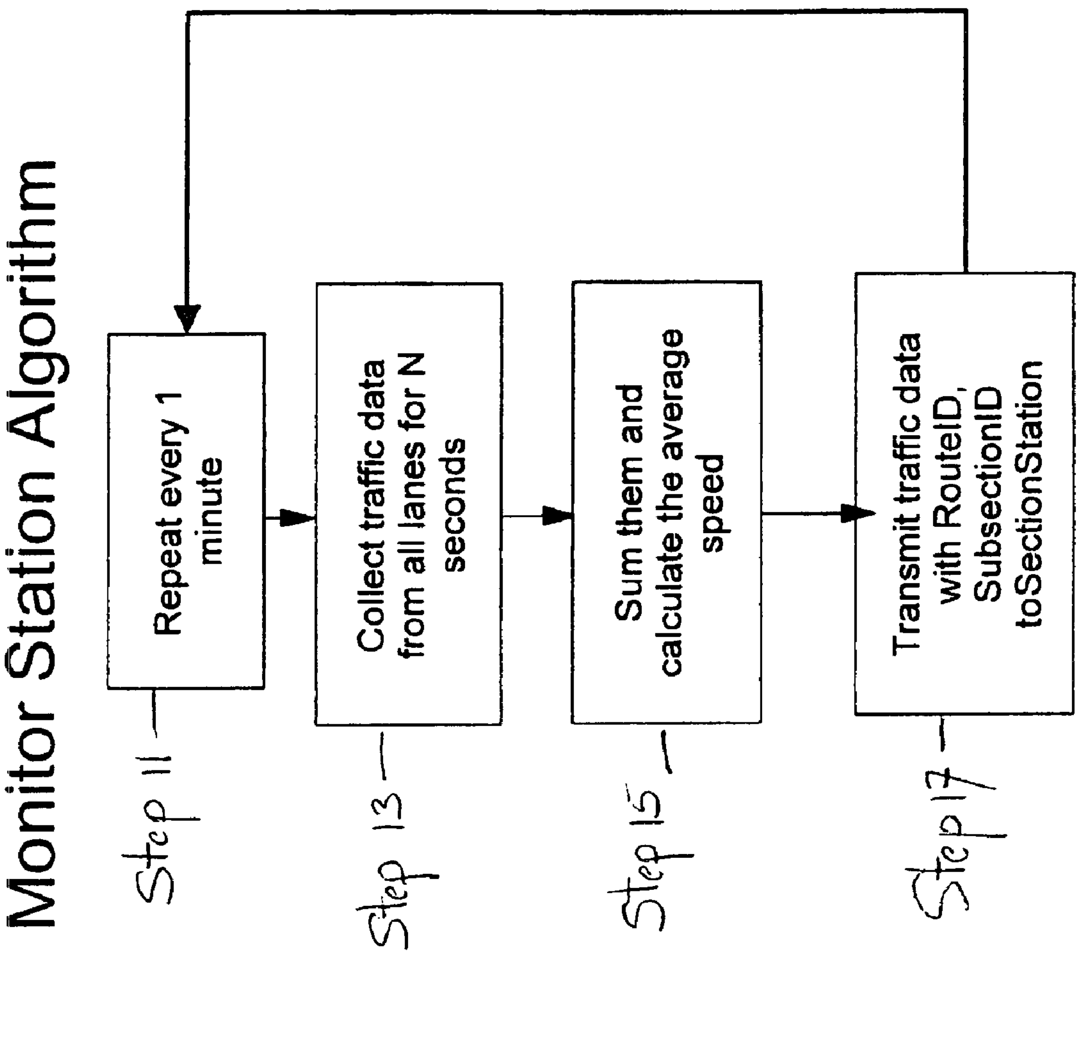
FIG. 4 is a sequence diagram illustrating the operation of an algorithm for use in a monitor station in accordance with this invention.

FIG. 4 displays the algorithm controlling the operation of each monitor station 10 in a system according to this invention where average speed is calculated within the monitor station and is then transmitted to the associated section station 20. That is, in step 13 each monitor 10 collects traffic speed data from all lanes for N seconds, where N is any desired, predetermined time interval such as for example 30 seconds; the processor 14 of station 10 sums the speed signals and determines the average speed of traffic passing the station during the determined interval, step 15, and then at the end of the cycle, transmission unit 16 transmits to the corresponding section station 20, in step 17, the calculated average speed together with identification of the source, including route identification and subsection identification as well as traffic direction, if needed. Following the completion of step 17 at the end of a cycle, monitor 10 returns to step 11 to begin repetition of its cycle of monitoring and reporting.

Figure 5:
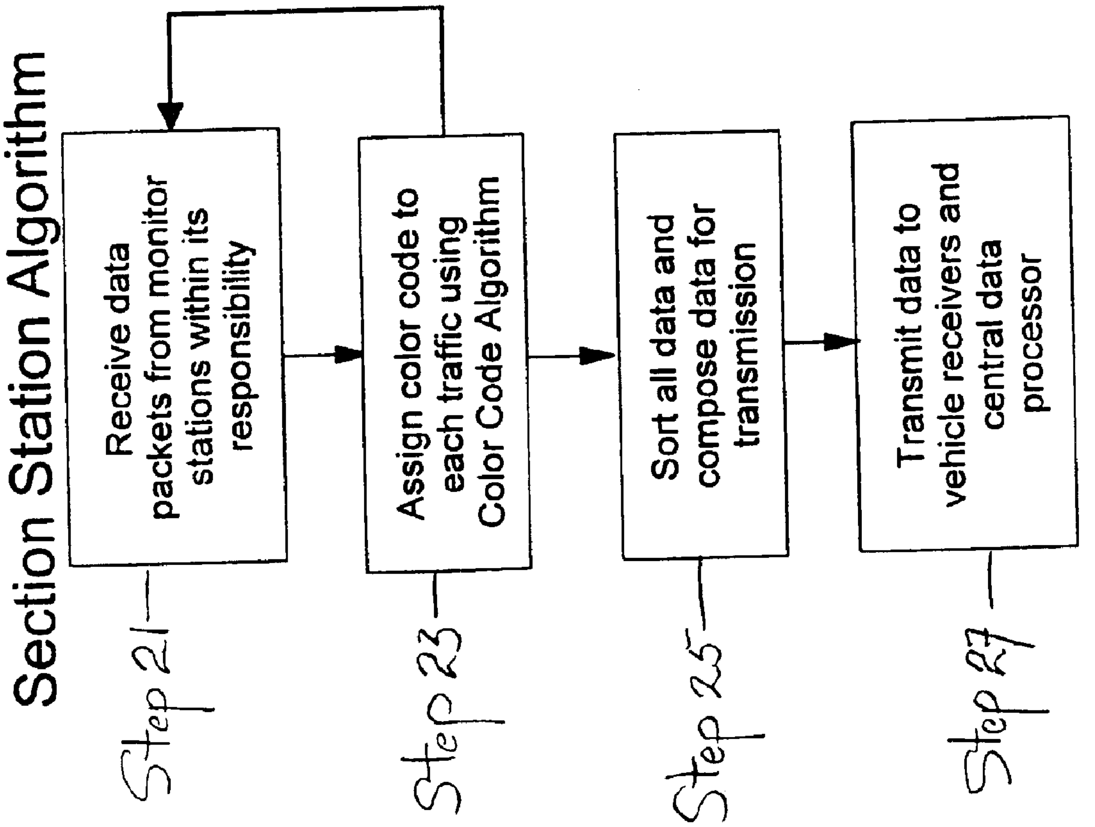
FIG. 5 is a sequence diagram illustrating the operation of an algorithm for use in a section station in accordance with this invention.

When the traffic speed and route identification data from each monitor station is received at the corresponding section station 20, following completion of step 17 at each monitor station, the section station processes the received data packet in accordance with this invention. That is, in accordance with the algorithm shown in FIG. 5 of the drawings, a section station 20 receives the sequential data packets from each associated monitor station 10 within its responsibility, in step 21. The data packets are received from each monitor station in step 21 and are partially processed to assign corresponding color coding in step 23, in sequence, until processor 24 determines that a report has been received from each monitor 10; at that point in time, the sequence of operations continues from step 23 to step 25. In step 23, each packet of data that is received in step 21, is assigned a color code in accordance with the color code algorithm of FIGS. 8A & 8B, to be described later herein. Although color-coding of traffic speed data is described here as being determined within the apparatus of section station 20, those with skill in the art will recognize that performing this function within section station 20 is largely a matter of choice. It is entirely possible to perform the color-coding function at any point in the system of the invention, once a packet of data representing average traffic speed for a given direction of a given monitor road portion is known and available. The choice of where to perform this function is largely dependent upon considerations of signal complexity, and reliability of the nature of the transmission route [e.g. wired or wireless] that is being used.

In step 25, The color-code-assigned data signals representing traffic speed conditions for each covered section and sub-section of a given section station 20, are sorted and composed for transmission via transmitter unit 28 to all available vehicle stations 40 and to any optional central processing station(s) 30. In this step 25, the data received from all monitor stations are sorted by route identification, section identification and subsection identification (which also corresponds generally to the monitor identification). This enables the vehicle receiving station to recognize and process the received data in accordance with this invention, more efficiently. The operation of vehicle stations 40 and central stations 30 will be described in further detail elsewhere herein.

At the conclusion of step 27, the algorithm of FIG. 5 will proceed to step 27, transmitting the processed data for reception by all vehicles, and then will return the operation of each section station 20 to step 21, so that the cycle of operation of the algorithm of FIG. 5 can begin again. Once again, it is noted that signal transmission to vehicle stations 40 of necessity must be wireless in nature, while transmissions from section stations 20 to a central station 30 may be in any desired and suitable form although it is assumed, in view of the distances likely to be involved, that wireless transmission will be preferable.

The operation of the system of this invention has been described, up to this point, in terms of the operation of the monitor stations 10 and the corresponding section station 20. Now, it should be understood that the operation of the vehicle station 40 is an essential aspect of the invention. More specifically, the vehicle station 40, as shown in FIG. 3, incorporates a display device unit 48 that provides the operator of the corresponding vehicle (not shown) with a valuable informational display in accordance with the invention. That is, display unit 48 may be an entirely conventional GPS navigational screen display device, set up to display route maps currently available for GPS navigation systems. However, it is a feature of this invention that the user/operator is provided with an on-board-vehicle map display in which each monitored route on the map is shown in colors representative of current, real-time traffic speed conditions on each route. Although GPS-related and other forms of on-board map displays are well known at this time, the inventor of this system believes that no other system provides information representative of real-time traffic speed conditions on a given route on an on-board map display.

Figure 9:
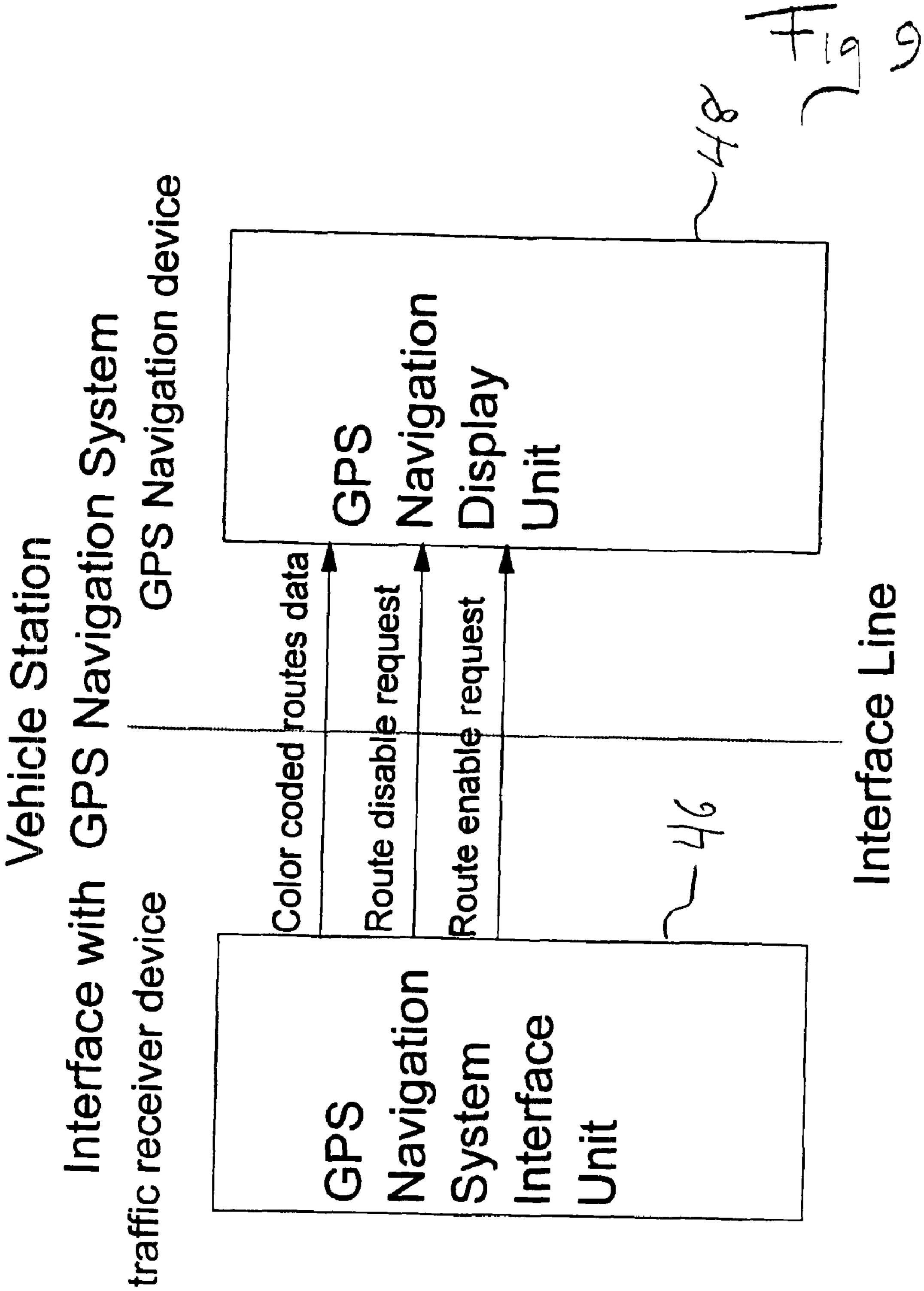
FIG. 9 is a block diagram symbolic representation of the interface between a vehicle station and a GPS navigation unit in accordance with this invention.

When a vehicle station 40 is in use, vehicle receiver 42 receives from the nearest section station 20 and supplies to microprocessor 44, signal packets containing section and sub-section identifying data provided by the section station and its associated monitor stations 10. This information is fed to GPS interface unit 46 which identifies the global geographic position of the vehicle station so that the corresponding geographical area map will be selected from on board map data base unit 50, with the support of vehicle station processor 44, for display on the screen of display unit 48 in accordance with existing technology. FIG. 9 shows in symbolic form, the information exchanged between interface unit 46 and display unit 48 to make it possible for the display unit to display route maps with color codes applied to the appropriate road portions. The "route disable" request and "route enable" request information shown in FIG. 9 is explained subsequently herein with reference to FIG. 13 and FIG. 14. In accordance with this invention, when the appropriate map is displayed on unit 48, color-coded traffic information signals received from the controlling section station 20 are applied through interface unit 46 to display local routes in colors corresponding to traffic speed on each route portion, in accordance with this invention.

As described up to this point, this invention can be seen to provide a map display system in which each monitored route on a displayed map of the area surrounding the vehicle will appear in a highlighted color indicative of the real-time average speed of current traffic on that route. Now it can be explained, with reference to FIG. 13, that a further feature of this invention utilizes the color-code algorithm of FIGS. 8A, 8B and FIG. 15, to identify average traffic speed that is below a predetermined acceptable threshold value, and then "disables" that portion of a route while seeking an alternate. That is, when average traffic speed below the pre-determined threshold value is recognized on a particular road section, processor unit 44 in vehicle station 40 follows a pres-set procedure in accordance with the algorithm illustrated in FIG. 13 to "disable" that route section. In this context, the term "disable" means that a signal is "attached" in any well-known manner to the identification data for that particular route section, so as to reset to a maximum number, say 9,999 hours, the normal "travel time" and/or distance assigned to that route portion within the GPS. The "normal travel time" data is readily available from the map database unit 50 associated with the GPS unit 48 in vehicle station 40. The "reset" values for the time and/or distance are stored conveniently in the memory of associated processor 44, together with the road section identification and the original "normal" values for that section, which are used later for "restoration" or "re-enablement" when appropriate, as explained elsewhere herein. When the indicated travel time for a road section becomes so large, that road section becomes "unacceptable" under standard GPS procedures, and existing GPS software automatically seeks an alternate route to be highlighted as the new "preferred" route on a displayed map. The color code assignment process of this invention continues in normal effect while a route portion is "disabled", so that when traffic speed returns to normal or acceptable values, and the associated color code appears on that section of road on the displayed map, the "disable" setting for the affected road section may be eliminated using the algorithm illustrated in FIG. 14.

Figure 14:
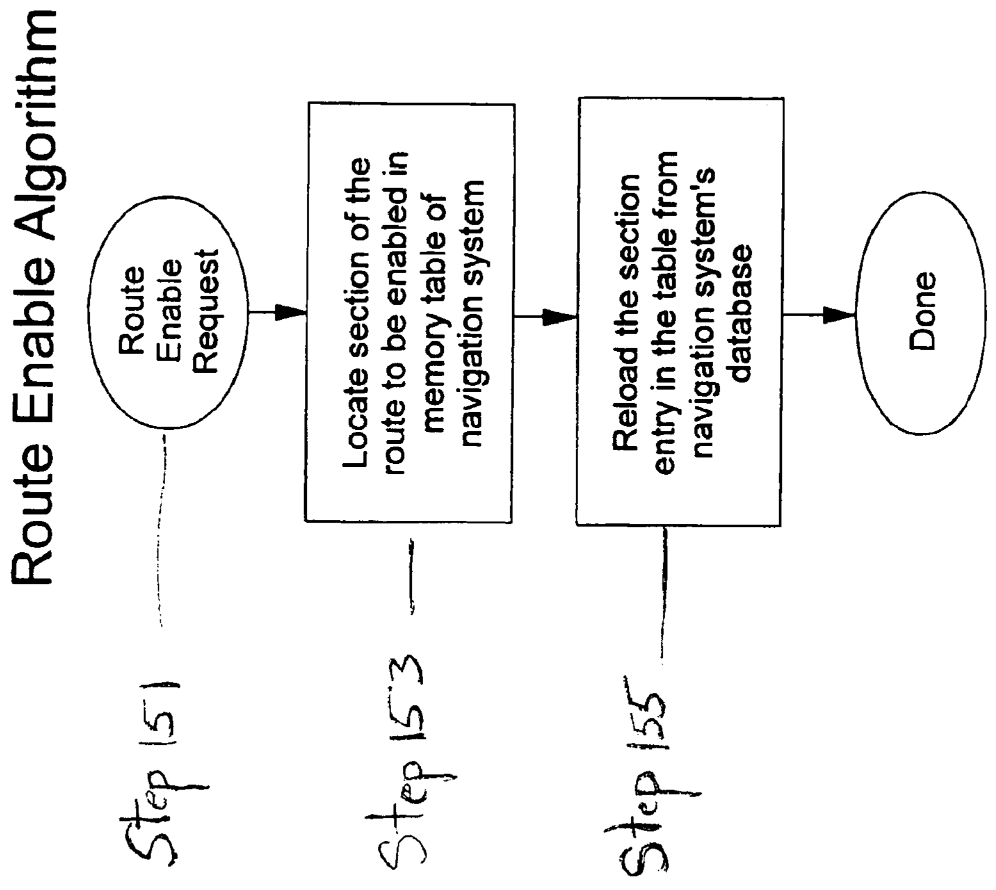
FIG. 14 is a sequence diagram illustrating the operation of an optional algorithm for automatically enabling a route that has been disabled in accordance with the algorithm of FIG. 13.

In accordance with the algorithm of FIG. 14, when a step 151 "route enable" request has been initiated in any manner, the processor of the affected station, preferably vehicle station 40, locates the identified "disabled" route portion in step 153 and proceeds to step 155 in which the original (i.e. "normal") travel time and/or distance values for that road portion are restored to map database unit 50 as mentioned elsewhere herein. The route "enable request" may be initiated in any convenient manner, but preferably it will be initiated automatically in response to detection of return of the average speed data for that section to its "normal" value as established and available within the GPS.

With regard to reception of signals from section stations 20 by vehicle stations 40, it will be understood that as a vehicle proceeds toward its destination, station 40 will necessarily progress away from one section station 20 while it approaches another. Accordingly, there will be times when the vehicle station 40 will be equidistant between two such section stations 20, and the vehicle station may well be within range of the transmitted signals from two or more such stations. Under such circumstances, a conventional signal-strength discrimination circuit of known design incorporated into or otherwise associated with vehicle receiver 42 will assure, for example, that the receiver 42 continues to function under the control of whichever section station signal it is then receiving; such control will continue until the relative strength of the signals from the next section station exceeds the strength of the signals from the then-current section station by a predetermined value or ratio. At that point, the conventional discrimination circuit causes receiver 42 to recognize the stronger of the two signals and to cease responding to the former, now weaker, signals.

Figure 8A:
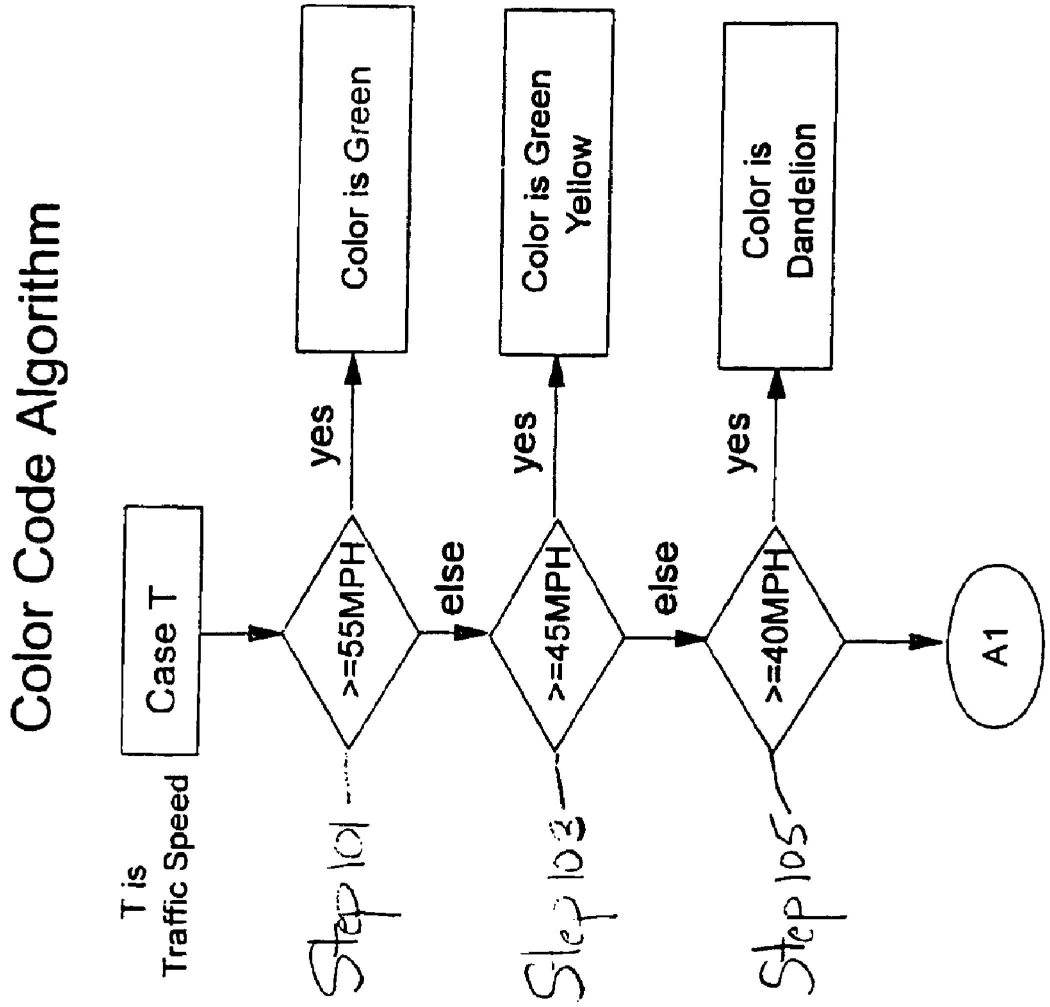
FIG. 8A is a sequence diagram illustrating the first part of the operation of an algorithm for assigning color codes to monitored routes in accordance with this invention.
Figure 8B:
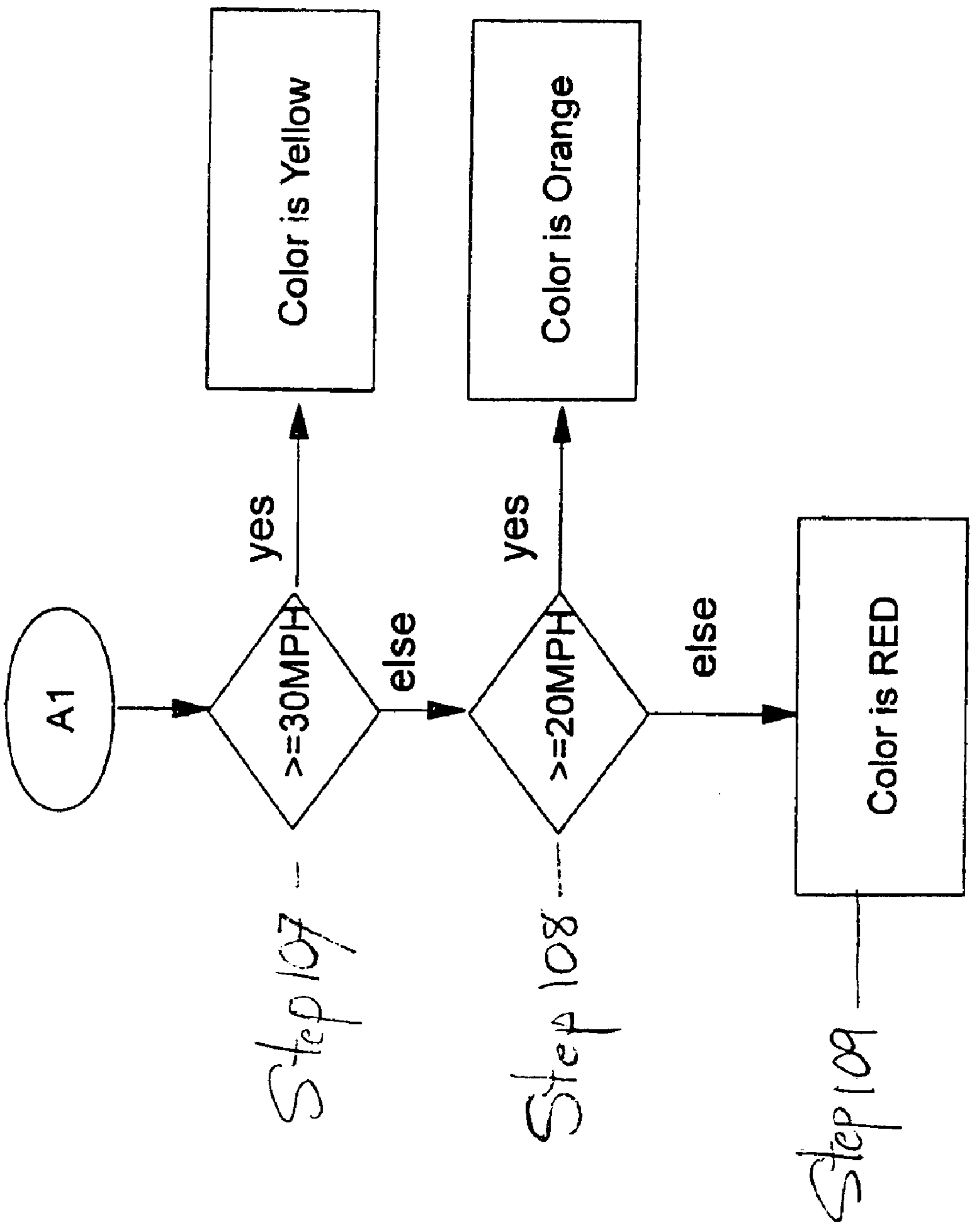
FIG. 8B is a sequence diagram illustrating the second part of the operation of the algorithm of FIG. 4.
Figure 15:
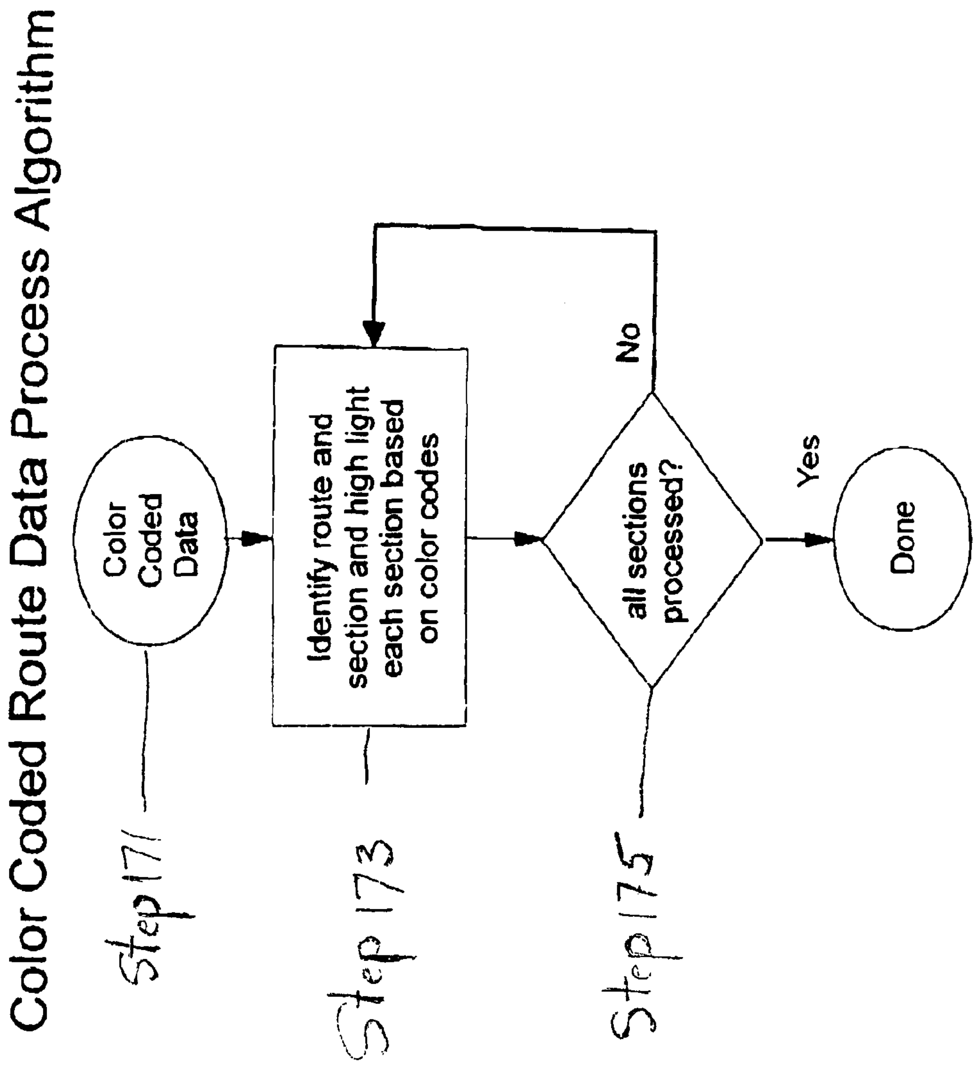
FIG. 15 is a sequence diagram illustrating the operation of an algorithm for applying color codes to all of the monitored route sections on a route map display after the corresponding colors for each monitored section have been selected in accordance with FIGS. 8A and 8B.

FIGS. 8A and 8B together with FIG. 15 illustrate the algorithms applied by section stations 20, in accordance with the invention, to assign color coding to monitored route sections, to be displayed as described above. That is, in step 101, for each monitor station 10 where the average traffic speed T is determined to be 55 miles per hour (MPH) or greater, the color assigned to the subsection of a route monitored by that monitor station is Green. The signal for "green" is associated with the corresponding route portion in accordance with established electronic display practice. If T is determined to be less than 55 MPH but greater than or equal to 45 MPH, step 101 proceeds to step 103 which then assigns the color Green/Yellow to the monitored subsection. Continuing in the same manner, if T is determined to be less than 45 MPH but greater than or equal to a predetermined minimum value, say 40 MPH, another color, Dandelion, is assigned to the display of the monitored subsection of a route. For the sake of completeness, it is noted that step 107 (shown in FIG. 8B) assigns the color Yellow to a monitored route portion where the traffic speed is determined to be in the range of less than 40 MPH and greater than or equal to, say, 30 MPH; for the speed range of less than 30 MPH and greater than or equal to 20 MPH the color Orange is assigned in step 108, and finally, in step 109, for speeds less than 20 MPH the color Red is assigned. It will be understood readily, that this color-assignment algorithm may be extended without difficulty to encompass any desired speed ranges higher and/or lower than those here described, and similarly may encompass speed ranges of any desired value, equal to or different from the 5 MPH and 10 MPH ranges here disclosed for illustrative purposes only.

When each traffic speed signal packet has been assigned a color code, that color is applied to the corresponding route map display data signal in accordance with the algorithm of FIG. 15. In step 171 processor 44 of vehicle station 40 receives the current color code data signals and assigns the appropriate color code to the corresponding route data signal in step 173 so as to display the related portion of each route in the indicated color corresponding to the current average traffic speed on that route portion. In step 175, the processor determines that each reported route portion has been processed and returns the processor to "waiting status" to begin the next cycle of color code application.

In the context of displaying traffic conditions for a particular route on a given map display, it should be noted that the system of this invention contemplates providing the operator of a vehicle with route status information on all monitored routes included within the scope of a displayed map. If desired, a particular destination may be selected (identified) manually using various forms of known electronic or electromechanical technology, including "keyed-in" entries on standard "keyboards" or dedicated and appropriately labeled, individual signal devices in vehicle stations 40, such as push buttons 49, shown associated with the GPS "on-board" display unit 48 in FIG. 11. When a particular destination is selected as by sending a GPS signal identifying a given geographic location, existing GPS technology is used to identify a "preferred" route, between the geographic location of the vehicle station and the geographic location of the selected destination; the "preferred" route is then highlighted for visual identification on an electronic display screen, in any conventional manner. In a well-known manner, a dedicated signaling device may be associated readily with a given location by merely activating the signal device in a first condition while the vehicle station associated with the signal device is located at the desired location; thereafter, the signal device may be activated under a second condition to transmit a signal identifying the associated geographic destination. The first and second conditions referred to, may be achieved easily for example, by activating a dedicated "record" push button [one of pushbuttons 49, for example] to achieve the first condition and allowing the "record" button to return to its at rest position to achieve the second condition.

With reference to receiver/display unit 48, it is noted at this point that systems and apparatus for requesting wide area route map and other forms of display data, as well as display devices such as unit 48, for receiving and rendering such data into informative visual displays, are well known in this art. Any suitable embodiments of such systems, apparatus and devices can be adapted readily for use in accordance with this feature of this invention, by one having ordinary skill in this art.

In normal operating mode, the system of this invention will color-code all of the monitored roads shown on the map displayed on unit 48. In accordance with the objects of this invention, this will provide the operator of the vehicle with unique route and traffic condition information sufficient to make an informed choice of a personal route to follow to the destination of the operator's choice. Alternatively, when a particular destination has been selected, all of the monitored roads will continue to be displayed in color-coded form, but the preferred route to the selected destination will be both color-coded and highlighted to indicate its "preferred" status. In this form of route display an existing capability of the GPS system is utilized; this is the capacity to process input information identifying a specific geographic destination within a given geographic area and to respond by highlighting a preferred route between the then-current location of a then-current station and a selected geographic destination.

In accordance with the invention, destination identification information may be supplied to the traffic display system through remote download interface unit 45, as mentioned previously herein. In one alternative as explained above, processor 44 may be coupled to one or more "dedicated" switches or push buttons 49 (shown in FIG. 11) to provide processor 44 with data signals representative of specific, predetermined destinations; in such case, processor 44 may be programmed readily in conventional manner to permit the predetermined destination or destinations to be changed at will via interface with the GPS, for the convenience of a user of the system of this invention. In a still further and preferred alternative, a dedicated push button or other signaling or activation device may be made to correspond to a particular, frequently-used destination by activating the switch in one condition, e.g. a "setting mode" or "record" mode, when the vehicle station is located at the destination location. That is, for example only, identification data for a given destination may be stored, or "recorded," for retrieval in response to activation of a specific, dedicated push button by entering a pre-determined code [to establish a first, condition, e.g. a "record" condition] and pressing the desired push button, when the vehicle is located at the desired destination. After the recording/storing operation is complete, the determined code may be canceled automatically to return the now-dedicated push button to a second condition in which it serves only to male the selected destination identification data code signal available to the traffic display system for further processing.

Once the mobile vehicle station has been made aware of a specific destination, a preferred route to that destination will be selected in accordance with the internal operations of the existing GPS navigation system, and in cooperation with the vehicle microprocessor 44, color-coding display information will be applied to that selected route. Color coding will beapplied, as well, to all other routes on the displayed map in accordance with the invention. Accordingly, the system of this invention permits the vehicle operator to choose whether to: [a] follow the highlighted preferred route or [b] voluntarily follow any other route, or [c] follow an alternate "preferred" route identified by the system of the invention in accordance with the algorithm shown in FIG. 6, which is explained below. In accordance with choice [b], the vehicle operator may simply ignore the displayed route and choose to follow another route among the roads shown on the displayed map.

Figure 6:
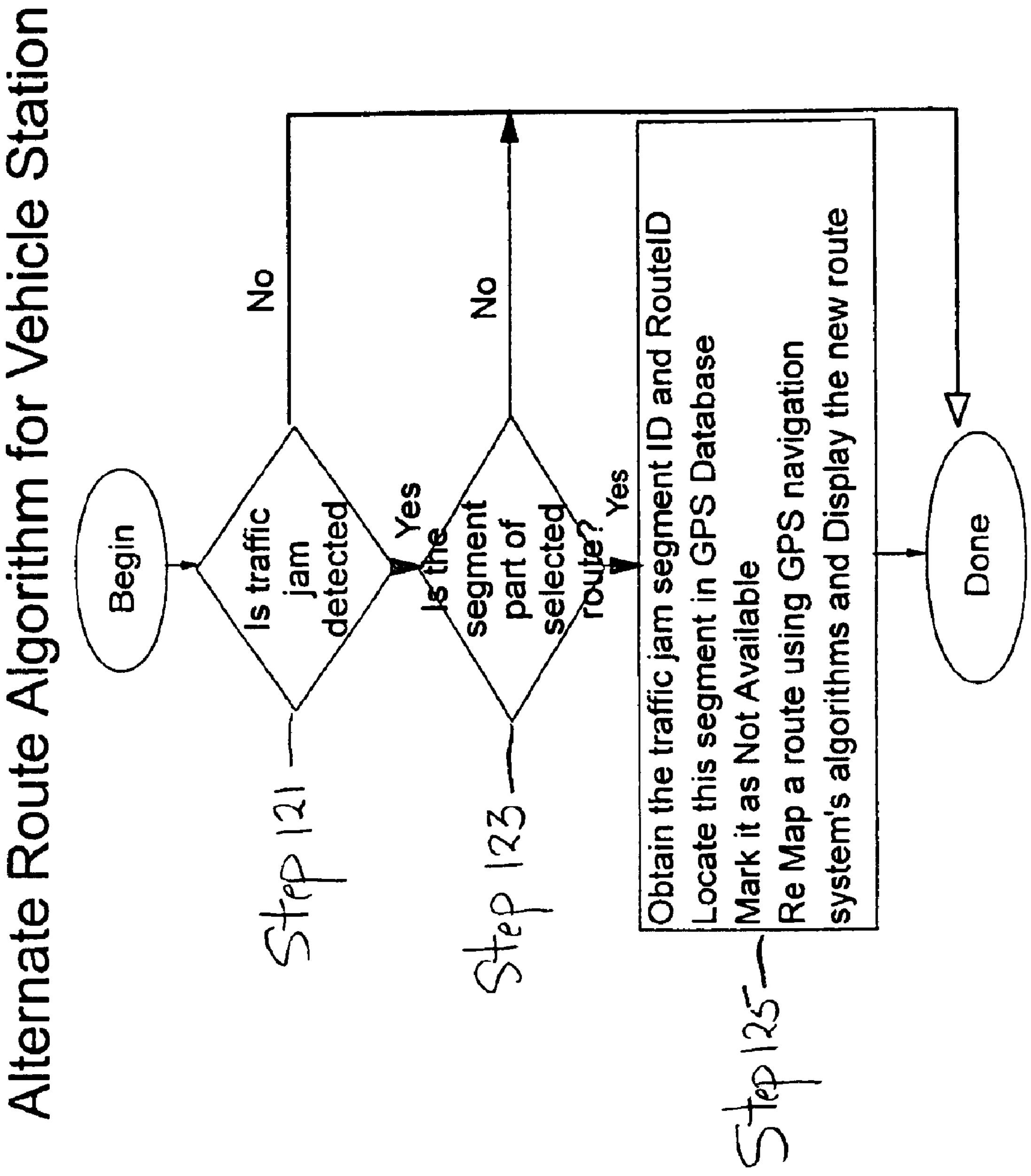
FIG. 6 is a sequence diagram illustrating the operation of an algorithm for identifying an alternate preferred route in accordance with this invention.
Figure 11:
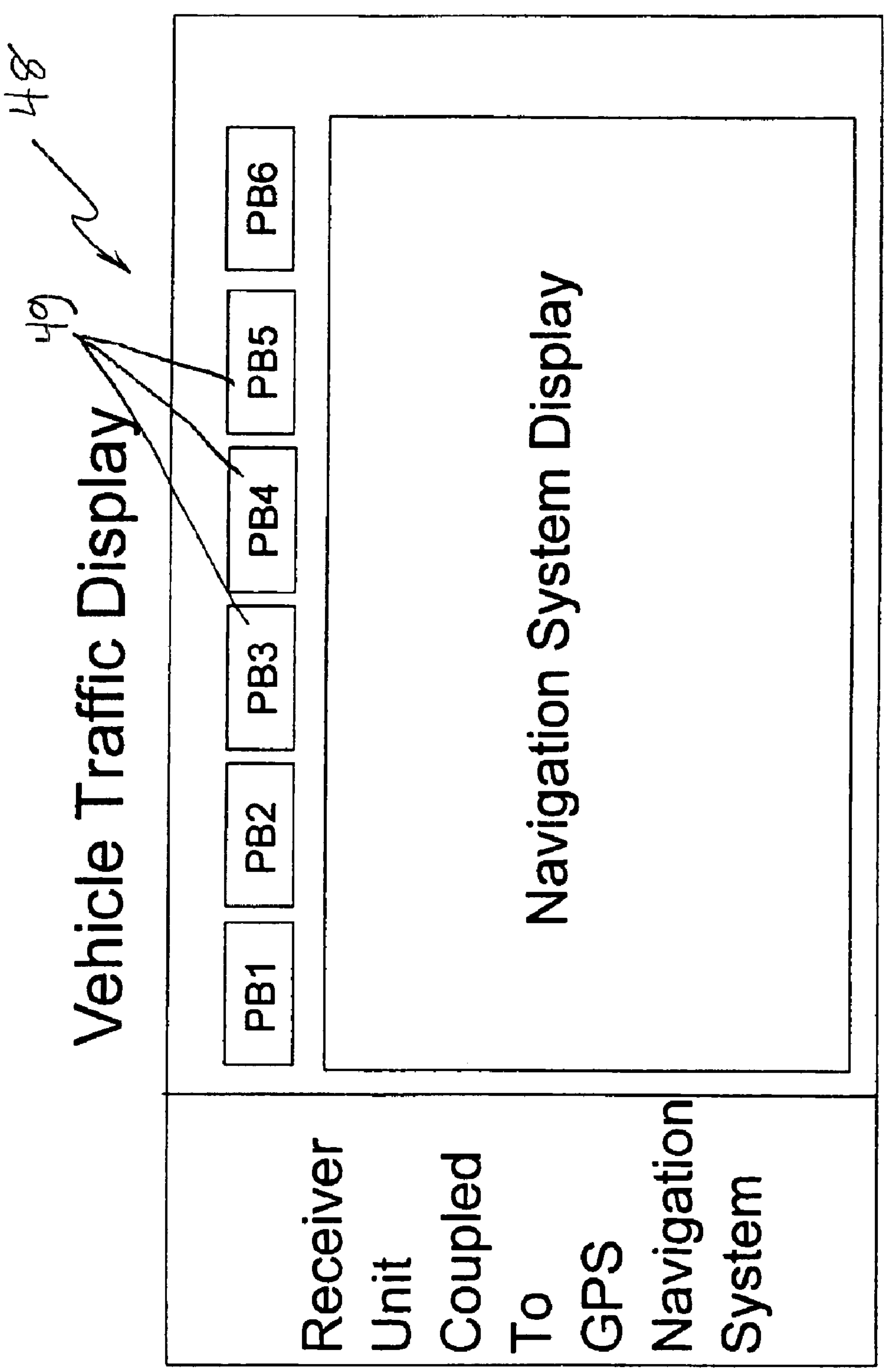
FIG. 11 is a simplified diagrammatic representation of a visual display unit incorporating optional features used in a vehicle receiving station in accordance with this invention.

In accordance with choice [c], the system of the invention preferably may be set up to proceed automatically into the algorithm of FIG. 6, or may be set up so that the algorithm will be carried out only upon activation of a specific "activation" signal from, for example, a "dedicated" push-button 49 such as is shown in FIG. 11. In brief, when the reported average traffic speed on any portion of a preferred route falls below a predetermined minimum value, that portion of the preferred route may be marked so as to "disable" that portion. In that case, the system of this invention may be programmed to automatically select an alternate preferred route in accordance with the algorithm illustrated in FIG. 6.

Figure 13:
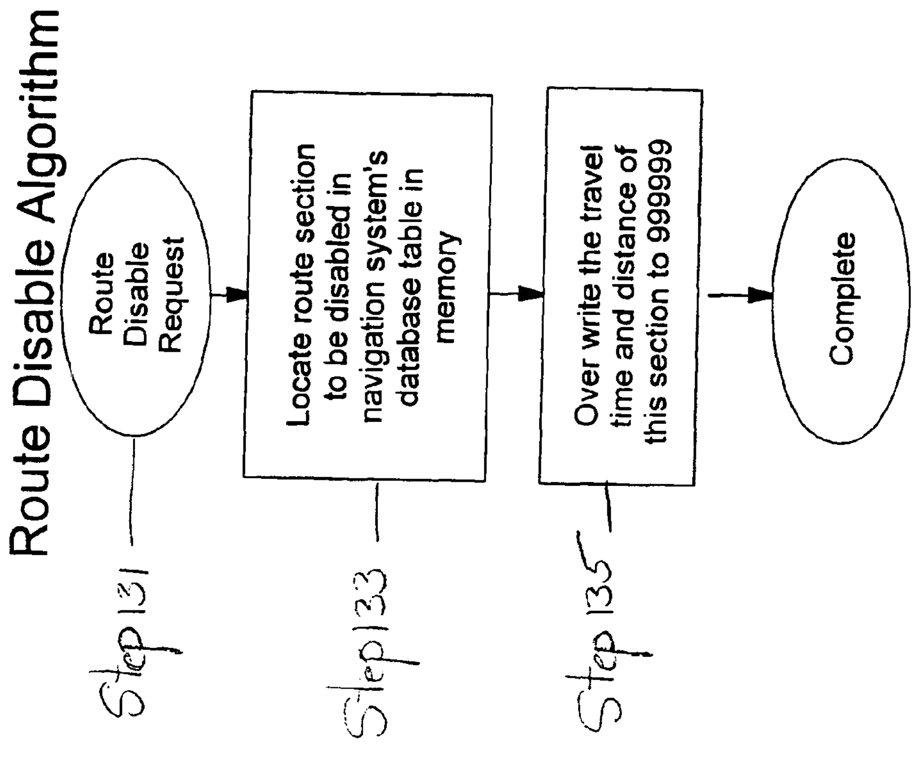
FIG. 13 is a sequence diagram illustrating the operation of an optional algorithm for automatically disabling a route that has been selected automatically in accordance with this invention.

The algorithm of FIG. 6 is automatically initiated by routine scanning to detect, in step 121, if any portion of any route has been assigned a color code that characterizes a "traffic jam", say, for example, a speed, T, under 20 MPH; if no such condition is detected, the algorithm terminates its operation by proceeding to "done", and resumes "waiting" status. In step 123, following detection of a color code signal indicating a traffic jam condition, the system determines if the identified road section coincides with any part of a preferred or "selected" route; if the identified section does not coincide, operation of the algorithm terminates and returns to done or "waiting" status, as above. If, on the other hand, the detected "traffic jam" road section is found to be part of a selected route, the algorithm proceeds to step 125, wherein the identification of that portion of a route is located in the GPS database unit 50 on-board the vehicle and is then marked by microprocessor 44 as "unavailable" or "disabled" in accordance with the algorithm of FIG. 13. As shown in FIG. 13, when a route portion is marked as Not Available in a vehicle station 40, in accordance with the algorithm of FIG. 6, a "disable request" is initiated within the vehicle station in step 131 of FIG. 13; in response to the disable request, the processor in the vehicle station marks the location of the "blocked" route section in step 133, and in step 135, the travel time and/or indicated length of the blocked section are (is) reset to a maximum number, say 999999 while the identification data of that section are stored by the processor. Next, the disable logarithm returns to its "complete", i.e. waiting condition. Subsequently, an alternate "preferred" route to the desired destination is "selected" for display using existing algorithms included in the GPS.

When a route section has been "disabled" in this manner, microprocessor 44 in vehicle station 40 (see FIG. 3) continues to control application of the color-coding signals received from section station 20 to each of the monitored routes displayed on display unit 48 of vehicle station 40, while GPS system controls continue to highlight the newly selected alternate preferred route.

Figure 7:
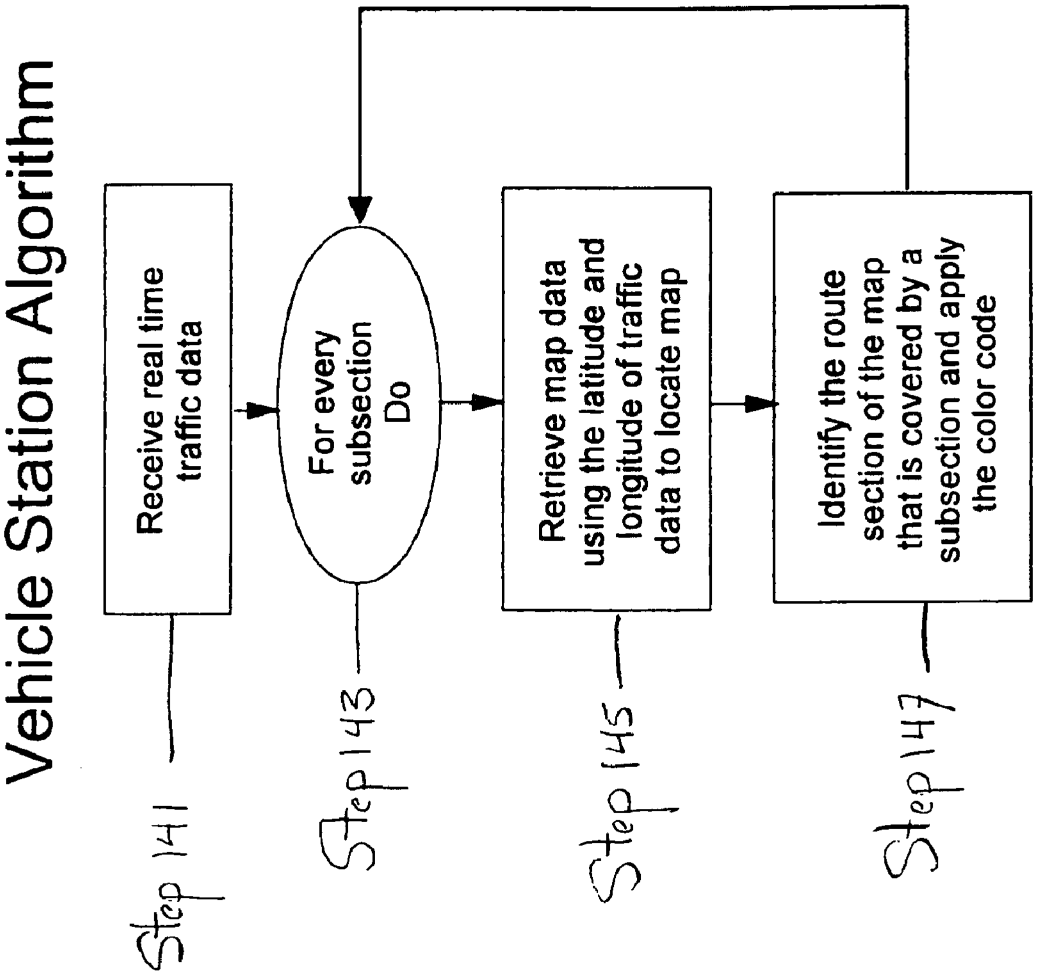
FIG. 7 is a sequence diagram illustrating the operation of an algorithm for use in a vehicle station in accordance with this invention.

The overall operation of a vehicle station 40, shown in FIG. 3, is understood most readily with reference to the algorithm set forth in FIG. 7. In FIG. 7, it is clear that a vehicle station 40 begins operation with step 141, by receiving signals from a nearby section station 20. In this regard, it should be noted that in a system with multiple section stations along various routes, there will come a time when a vehicle station in a moving vehicle will be located within range of say two different section stations. It is also entirely possible that the range of transmission of signals from two nearby stations are likely to overlap, at least at times. Under these conditions, the vehicle station processor 44 is set up to select for processing, the stronger of the two signals, in accordance with well-known standard protocols for signal strength selection. Referring again to FIG. 7, it can be seen that step 143 instructs processor 44 to analyze, in step 145, the route identification signal for every monitored subsection of a route reported by the selected section station 20 so as to retrieve the appropriate map data and to locate the corresponding appropriate map for display. When step 145 is completed, processor 44 proceeds to step 147 in which the color codes applied by section station 20 are applied to the map for display on display unit 48 in the receiving vehicle station 40. As mentioned previously herein, the generation and application of color code signals in step 147 can be carried out alternatively in other processors within the apparatus of the invention as, for example, in the processor of each of the monitor stations where the traffic information is first detected. Step 149 shown at the right side of FIG. 6, returns the algorithm cycle back to its beginning for another cycle, when the last subsection signal packet is received from the subject section station 20.

FIG. 9 of the drawings illustrates, for convenience, the information exchanged via the GPS interface unit 46 across the interface between a vehicle station 40 and the GPS navigation display unit 48 associated with the vehicle station. As shown in this figure, vehicle station 40 provides to the navigation display 48 via the GPS interface unit 46 four different kinds of signals to control the visual display on unit 48. These signals are, namely, [1] the color-coded route data received from a section station 20; [2] the "route disable" signal that identifies a particular section or sub-section of a route as unusable due to a "traffic jam" situation having been detected; that is, the calculated "average speed" for the monitored road is zero or substantially below a minimum value, say 5 or 10 miles per hour; and [3] a "route enable" signal generated by processor 44 and interface unit 46 together, in response to either a GPS route identification signal or a route request entered into the remote download interface unit 45. With reference to interface unit 45, it should be understood that the function of the interface is to receive and process input data in various forms from external sources such as the output of a laptop computer [not shown] and exchange that data with microprocessor unit 44.

Figure 12:
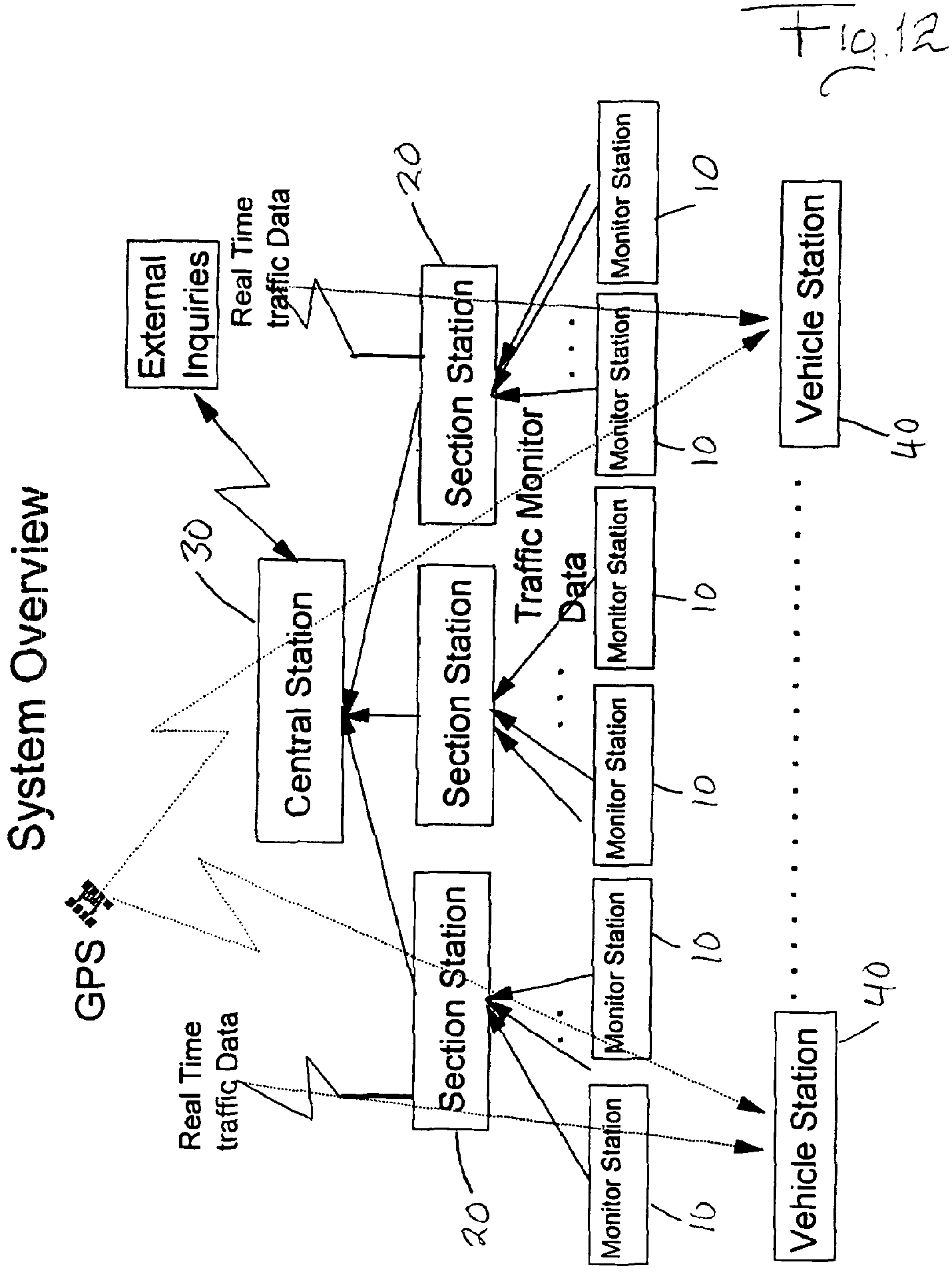
FIG. 12 is a block diagram representing an overview of a traffic display system in accordance with this invention.

The underlying basic system of this invention has been disclosed in the specification set forth up to this point, with each element of the system having been described together with its function within the system. Now, summarizing the system and its operation as they have been described up to this point, and referring to the "system overview" of FIG. 12, it will be recognized that vehicle stations 40, each including a receiver 42, a processor 44, and a GPS display unit 48 are carried in individual vehicles that participate in using the system. A plurality of section stations 20 are positioned at spaced-apart locations along vehicular roadways, and groups of monitor stations 10 are positioned at spaced-apart locations along the roadways, each group of monitor stations being located in the vicinity of, and being associated with, a particular section station. Each of the monitor stations 20 senses the speed of vehicular traffic in one or both directions in the vicinity of the monitor station and transmits corresponding information signals to an associated section station 20; in turn, each section station receives signals from its plurality of associated monitor stations 10, processes the received signals preferably imparting color codes to specific, identified route signals in response to traffic conditions reported by the monitor stations for their corresponding sub-sections of a route, and transmits/broadcasts those "real-time" traffic data signals via data transmission unit 28, for receipt by vehicle stations 40 in the area. Although it has been mentioned that color-coding of the traffic signals transmitted by each monitor station is preferably generated at the section stations, it will be understood that color-coding may, in accordance with this invention, be assigned if desired at other points along the signal transmission/processing path, such as at each monitor station or in each vehicle station.

Continuing this summary of the operation of the system of this invention: receiver unit 42 in each vehicle station 40 supplies the received traffic data signals to the vehicle processor 44 which then interacts with display unit 48 and with the received route section identification signals, via map database unit 50, to display a map of the area surrounding the vehicle station 40. Optionally, a user may choose to activate a control switch or device 49 to "request" that display unit 48 interact with the GPS system, using GPS interface unit 46, to display wide area road maps other than those stored in map database unit 50 in vehicle station 40 to provide the user/vehicle-operator with a different or enhanced perspective of the surrounding area. Such maps may be stored at and made available from optional central station 30, identified elsewhere in this specification. Communications between vehicle station 40 and the GPS system may use any suitable form of communications system available for this purpose. The choice between color coding all of the roads or only selected routes is made by the user of the system by choosing to provide processor 44 of vehicle station 40 with data identifying a particular destination for the vehicle station; if a particular destination is not identified or "given," all of the roads shown on the displayed map on display unit 48 are color-coded. The color-codes are supplied together with the signals transmitted by the station selected to perform this function, as explained elsewhere in this specification, in accordance with the algorithm shown in FIGS. 8A and 8B.

Although a preferred embodiment of the invention has been illustrated and described, those having skill in this art will recognize that various other forms and embodiments now may be visualized readily without departing significantly from the spirit and scope of the invention disclosed herein and set forth in the accompanying claims.

What is claimed is:

1. A method of operating an electronic vehicular traffic flow display system using mobile receiving stations in vehicles in cooperation with the methods of the existing Global Positioning System, said method comprising the steps of:

monitoring the speed of traffic, over a given period of time, in a given direction, on serial sub-sections of given roads in a given geographic area;

calculating the average speed of said traffic;

creating signals representing the average monitored traffic speed for specific portions of said given roads, and associating identifying signals for each said specific road portion associated with each said average traffic speed signal;

transmitting said traffic speed signals, and said specific road portion identification signals to a mobile vehicular receiving station;

determining the average speed of each of said traffic speed signals;

assigning a different color code to each one of a plurality of pre-determined average speed ranges;

providing each mobile station with pre-defined, stored road map signals representing road maps of geographic areas;

providing signals from said section stations to said mobile stations identifying the appropriate map to display for the geographic area of said section station;

selecting and displaying said appropriate one of said road maps at said mobile vehicular receiving station;

applying said color codes to said displayed road map to show said specific road portions in colors corresponding to said average speed for each said specific road portion, making destination data signals available to one of said mobile receiving stations to identify a specific destination location;

identifying the then-current location of said mobile receiving station by accessing signals from said GPS;

accessing said GPS to identify a preferred GPS route from said then-current location to said specific desired location; and displaying said preferred route in highlighted fashion in accordance with existing display algorithms of said GPS;

accessing data in said system data to determine if a first GPS preferred route between the known location of a mobile receiving station and a selected destination location has been identified;

periodically determining if the current average speed for any given portion of said first GPS preferred route is less than a predetermined minimum value;

in response to identification of any such given route portion, accessing the GPS standard travel time value routinely assigned to said such given route portion by said GPS and temporarily resetting said travel time value to a given maximum value such that said given route portion does not meet the requirements for inclusion by said GPS in a GPS preferred route.

2. A method of operating an electronic vehicular traffic flow display system using mobile receiving stations in vehicles, in accordance with claim 1, further comprising the steps of:

storing said destination data signals identifying said specific destination location in one of said mobile receiving stations by accessing said signals from said GPS while said mobile receiving station is located at said specific destination; and making said stored destination data signals available selectively for use in identifying said desired specific destination location.

3. A method of operating an electronic vehicular traffic flow display system using mobile receiving stations in vehicles, in accordance with claim 2, further comprising the steps of:

storing said destination data signals identifying said specific destination location in one of said mobile receiving stations by accessing said signals from said GPS while said mobile receiving station is located at said specific destination;

making said stored destination data signals available selectively for use in identifying said desired specific destination location, temporarily storing identification data for said given route portion, while periodically comparing the reported current average speed data value for said given route portion to the GPS standard travel time value for said rejected route portion until said current average speed data corresponds to a value within the range of said GPS standard travel time value for said rejected route portion; and accessing said temporarily set maximum time value and resetting said maximum time value to said GPS standard time value, so that said rejected route portion again qualifies for inclusion in a GPS preferred route.

4. A method of operating an electronic vehicular traffic flow display system using mobile receiving stations in vehicles, in accordance with claim 2, further comprising the steps of:

causing said GPS to select a second GPS preferred route to said given destination following said step of temporarily resetting said GPS standard travel time value to a maximum value; and highlighting said second GPS preferred route on said one of said road maps that is on display.

* * * * *